United States Patent [19]

Childs et al.

[11] Patent Number: 4,515,216

[45] Date of Patent: May 7, 1985

[54] METHOD OF USING THIXOTROPIC CEMENTS FOR COMBATING LOST CIRCULATION PROBLEMS

[75] Inventors: Jerry Childs; Fred Sabins, both of Duncan; Mary J. Taylor, Sterling, all of Okla.

[73] Assignee: Halliburton Company, Duncan, Okla.

[21] Appl. No.: 540,741

[22] Filed: Oct. 11, 1983

[51] Int. Cl.$^3$ .................................... E21B 33/138
[52] U.S. Cl. ................................ 166/293; 106/90; 106/93; 166/295; 166/300; 523/130
[58] Field of Search ............... 166/283, 293, 295, 300; 106/90, 93; 523/130

[56] References Cited

U.S. PATENT DOCUMENTS

| | | | |
|---|---|---|---|
| 2,491,487 | 12/1949 | Faulwetter | 106/90 |
| 2,935,522 | 5/1960 | Samour | 260/429 R X |
| 3,804,174 | 4/1974 | Chatterji et al. | 166/293 |
| 3,835,926 | 9/1974 | Clement, Jr. | 166/292 |
| 4,082,563 | 4/1978 | Ellis et al. | 106/93 X |
| 4,236,849 | 12/1980 | Kennedy-Skipton | 166/293 X |
| 4,280,848 | 7/1981 | Ellis et al. | 106/93 X |
| 4,321,968 | 3/1982 | Clear | 166/293 X |
| 4,340,525 | 7/1982 | Hubner et al. | 106/90 X |
| 4,461,856 | 7/1984 | Willis et al. | 523/130 X |

*Primary Examiner*—George A. Suchfield
*Attorney, Agent, or Firm*—Robert A. Kent; Thomas R. Weaver

[57] ABSTRACT

Thixotropic cement composition comprising water, hydraulic cement, titanium chelates, and crosslinkable agents and methods of using same for sealing or cementing subterranean zones penetrated by a borehole are provided.

14 Claims, No Drawings

METHOD OF USING THIXOTROPIC CEMENTS FOR COMBATING LOST CIRCULATION PROBLEMS

BACKGROUND OF THE INVENTION

1. Field of the Invention

This invention relates to thixotropic cement composition and methods of using same, and more particularly discloses a method for sealing or cementing subterranean zones penetrated by a borehole, such as cementing the annular space between an oil or gas well casing and the surrounding formation.

2. Description of the Prior Art

Oil, gas and water formed in the ground are under great pressures. Drilling into these formations requires borehole pressures to overbalance the formation pressure to prevent the uncontrolled flow of these formation fluids into the well bore. These pressures are controlled by maintaining sufficient hydrostatic pressure in the borehole. This is initially accomplished by circulating drilling fluids through these pressurized intervals.

Commonly, the first step in operations conducted to produce hydrocarbons from subterranean formations, is to cement or seal the area between the casing and the formation wall. This is accomplished via either directly introducing the cement into the space between the formation wall and the outer side of the casing or via pumping the cement into the casing with sufficient pressure to force the cement back up the annular space between the outside of the casing and the formation wall. Such initial cementing operations are referred to as primary cement.

Other types of jobs utilizing cement during the life of a well are referred to as secondary or remedial cementing. Such secondary cementing deals with completion and remedial repairs on a well after the producing zone is reached. Such activities include squeeze cementing (a procedure whereby a slurry is forced into the formation by pumping into the hole while maintaining a back pressure), plugging back with cement to shut off bottomhole water, plugging of crevices, cavities, leaks, and "thirsty" formations that cause lost circulation, and cementing casing leaks.

To described a typical well operation would not be an easy task as cementing conditions may range from very shallow to in excess of 30,000 feet. However, in all wells, two fundamental conditions are present that are not normally found in the handling and placement of concrete, i.e., temperature and pressure. Temperatures may range from below freezing in the permafrost in Alaska and Canada to 700° F. in geothermal steam wells of the Salton area of Southern California. Pressures in the deep, hot wells may exceed 20,000 psi and, along the Gulf Coast, cementing pressures in excess of 10,000 psi are not uncommon. Both have their influence in the effective placement of cement beneath of earth's surface.

Cavernous or interconnected vugular zones require only that the fluid pressure in the zone be exceeded to create complete lost circulation. The most common type of lost circulation is attributed to the formation pressure parting or fracturing. Breakdown gradients of 0.60 to 0.65 psi/ft are common in many areas and weak, low-resistant formations with parting pressure less than 0.5 psi/ft are occasionally encountered. Not all formations which have low fracturing gradients result in lost circulation problems. Many formations are drilled with mud densities in excess of the fracturing pressure. Apparently the mini-fractures which are encountered promptly plug with mud solids and drill cuttings. This buildup conditions the wellbore which allows the mud pressure to exceed the normal fracturing extension pressure. Unfortunately, many zones will accept large amounts of drilling mud (or cement slurry) without plugging. Such formations act as pressure relief valves and can often result in cement loss where the critical pressure is exceeded.

Squeeze cementing is a well-known procedure in the art relating to the oil field industry. In general, squeeze cementing is utilized to attempt to obtain a positive and permanent seal between the well bore at the subterranean earth formation surrounding the well bore at a desired location. A problem frequently encountered in squeeze cementing is the loss of the slurry to the formation. In highly permeable or porous formation, a substantial portion of the cement utilized may be absorbed by the formation due to its low resistance to fluid flow thereby preventing a positive seal from being obtained.

The petroleum industry has employed thixotropic cements primarily to assist in controlling lost circulation problems, in certain squeeze cementing applications and in situations where maintaining annular fill is a problem. Cements possessing thixotropic properties are desirable since they provide rapid development of static gel strength after placement. That is to say, thixotropic cements are designed so that slurry viscosities remain low while the slurry is moving, but when allowed to remain static will rapidly gell.

An example of a thixotropic cement composition and a method of using same to seal subterranean formations is described in U.S. Pat. Nos. 3,835,926 and 3,928,052. The composition is comprised of water, hydraulic cement, a silicate compound, a hydroxide and a salt. U.S. Pat. Nos. 3,959,003 and 3,804,174 describe a cement composition that includes as an additive a complex reaction product of a water-soluble carboxyalkl, hydroxyalkyl or mixed carboxyalkylhydroxyalkyl ether of cellulose and a polyvalent metal salt. The composition exhibits thixotropic properties and the preferred reaction product uses hydroxyethylcellulose and zirconyl chloride. Unfortunately, new testing procedures have indicated that the compositions of these patents exhibit rather limited thixotropic properties.

There are several disadvantages associated with the above compositions. In many slurry designs, it is difficult to control the magnitude of static gel strength development through adjustments in additive level. Increasing the additive levels tend to prohibitively shorten the thickening time. Further, acceptable thixotropic response beyond about 200° F. is difficult to achieve. Still further, acceptable thixotropic response in light weight slurries is also difficult to attain.

Accordingly, a need exists for a method of cementing oil and gas wells that provides a highly thixotropic cement slurry that develops high gel strengths in a sufficiently short time span to be useful in combating lost circulation problems.

SUMMARY OF THE INVENTION

A variety of titanium chelates are used in combination with a crosslinkable agent selected from the group consisting of water-soluble cellulose ethers such as hydroxyalkyl cellulose, carboxyalkyl cellulose, or carboxyalkylhydroxyalkyl cellulose; polyvinyl alcohol, homopolymers, copolymers or terpolymers of 2-acrylamido-2-methylpropane sulfonic acid (AMPS), sodium vinylsulfonate, acrylamide, N,N dimethylacrylamide and acrylic acid; and mixtures therof to produce cement slurries that have pronounced thixotropic properties and rapidly develop very high static gel strengths. More particularly, such a thixotropic slurry comprises water, hydraulic cement, a titanium chelate crosslinking agent, and a crosslinkable agent selected from the group consisting of water soluble cellulose ethers such as a hydroxyethyl cellulose (HEC) or carboxymethylhydroxyethyl cellulose (CMHEC); polyvinyl alcohol, homopolymers, copolymers or terpolymers of 2-acrylamido-2-methylpropane sulfonic acid (AMPS), sodium vinylsulfonate, acrylamide, N,N dimethylacrylamide and acrylic acid; and mixtures thereof. Such a slurry may optionally include other common cement additives such as retardants.

It has been discovered that the magnitude of the static gel strength can be controlled by the level of added titanium chelate and cellulose derivatives. Such slurries can be designed to effectively combat lost circulation problems. The amount of complexing agent, titanium chelate, used has significantly less influence on the slurry thickening time than the compositions mentioned above. Excellent thixotropic response with various titanium chelates has been noted at temperatures above 200° F. Finally, the titanium complexing agents more efficiently impart thixotropic properties to light weight cement slurries than those now used in the art.

So that the above-recited features, advantages and objects of the invention, as well as others, which will become apparent, are attained and can be understood in detail, more particular description of the invention is set forth below with respect to typical embodiments thereof, but the described embodiments should not be considered limiting of the scope, for the invention may admit to other equally effective embodiments which will be apparent from the description to one of ordinary skills in the art.

DESCRIPTION OF THE PREFERRED EMBODIMENTS

In well completion operations cement slurries are almost universally used to fill the annular space between casing and open hole. After setting, the principal functions of such cement slurries are to restrict fluid movement between formations to protect the casing from corrosion and to support the casing. Cements are made from high calcium carbonate materials, such as limestone, and clay shale, iron and aluminum oxides are sometimes added to supplement the amount of each found in the clay or shale. The API publication, "API Specifications for Materials and Testing for Well Cements", API Spec 10, First Edition, January 1982, describes specifications for cement used in the formulation of cementing slurries for oil well applications.

The cement slurry thickening time is strongly dependent upon temperature and pressure. To obtain optimum results a variety of additives are often included in the formulation of a cement slurry to vary cement density, increase or decrease strength, accelerate or retard setting time, control filtration rate, reduce slurry viscosity, increase resistance to corrosive fluids, bridge formations for lost circulation control, and improve economics. Essentially, a cement meeting API specifications is mixed with water and other additives to provide a cementing slurry appropriate for the conditions existing in each individual oil well.

In the present invention, it was found that certain titanium chelates can be used as crosslinking agents and provide excellent thixotropic properties and gel strength development. Further, the titanium chelates of this invention along with an appropriate crosslinkable additive can promote the development of sufficient static gel strength in a sufficiently short time frame so as to be effective in combating lost circulation. However, the titanium chelate crosslinking agents are somewhat sensitive to temperature, and hence, in developing a specific slurry one must be concerned with the downhole circulating temperature.

Another related benefit of the present invention relates to the discovery that use of titanium chelate cement additives in thixotropic or even conventional cement slurries containing conventional additives (including dispersants) result in the achievement of uniform or enhanced compressive strength development. Often the development of adequate compressive strength in 12 or 24 hours can be extremely difficult to obtain at liner tops, especially when the liner is long enough that the static temperature at the top of the liner is near or below the Bottom Hole Circulating Temperature (BHCT). In some liner jobs the top of the liner static temperature is 15° to 40° F. cooler than the BHCT. In these cases the cement slurries may take an excessive amount of time to reach enough compressive strength for the company to continue operations. The cement compositions of the present invention combat this delay in compressive strength. The present compositions are shear sensitive, meaning that while undergoing shear such compositions remain fluid and pumpable for an ample period of time, but when static, such compositions develop high gel strength in a short period of time followed by rapid compressive strength development.

The material to be crosslinked is selected from the group consisting of water-soluble crosslinkable resins such as cellulose ethers exemplified by hydroxyalkyl cellulose, a carboxyalkyl group consisting of cellulose or carboxyalkylhydroxyalkyl cellulose; polyvinyl alcohol; homopolymers, copolymers and terpolymers of AMPS (2-acrylamido - 2-methylpropane sulfonic acid), sodium vinylsulfonate, acrylamide, N, N-dimethylacrylamide, and acrylic acid; and mixtures thereof.

The titanium crosslinking agents are titanium chelates. Titanium chelates are formed by the reaction of titanium tetrachloride or titanium alkoxides (usually $C_2$–$C_4$) with a wide variety of bi- or multi-functional organic compounds. One of the functional groups of the organic compound is usually hydroxyl (or enolic carbonyl) for interchange with a chloride or alkoxyl group attached to the titanium atom in the titanium chloride or alkoxide, thus liberating one mole of HCl or alcohol. The other group of the organic compound can also be hydroxyl or carboxyl, carbonyl or amino, and as a result glycols, hydroxy acids, dicarboxylic acids, diketones, keto esters and alkanolamines are available for chelation. For the most part glycols, hydroxy acids and dicarboxylic acids are stable in aqueous solution, while diketones, keto esters and alkanolamines are solvent-soluble and hydrolize at varying rates in aqueous systems.

A series of tests were conducted to determine how effective a variety of titanium chelates were in producing thixotropic behavior. The cement slurries tested were prepared by dry blending all the additives with the cement prior to addition of water. If any liquid additives were used, the liquid was added to the mixing water prior to adding cement. The cement slurry was placed in static gel strength measuring device and a standard thixotropic test was conducted.

The static gel strength measuring apparatus consists of three major components, the chamber and lid, the magnetic drive assembly, and the cord pulling assembly.

The chamber is a heavy wall, high strength metal vessel equipped with strip heaters attached directly to the outside of the chamber. A thermocouple is inserted into the vessel to allow the temperature of the vessel to be controlled. The lid of the chamber is equipped so that the principle drive shaft of the magnetic drive assembly can be inserted. On the shaft a stirring paddle is fitted over one end of the shaft and secured with a shear pin. On the other end of the principal drive shaft the magnetic drive head is connected. The magnetic drive head is then in turn connected by a belt system to a variable speed magnetic drive power source and torque measuring device. A thermocouple is inserted through the top of the magnetic drive head and down the middle of the hollow principal drive shaft. The lid of the chamber is equipped with two ports. One port is connected to a pressure volume pump used to generate pressure and the other port is equipped with a quick opening saftey valve. The bottom of the chamber is equipped with a quick opening valve and used to relieve the pressure and discharge the test slurry at the end of the test period. The cord pulling mechanism consists of a cord pulling capstan or drum arrangement driven by a variable speed gear motor with the cord running through the pulley arrangement to a load cell and then to the top of the magnetic drive head.

To determine the gel strength development of cement under down hole conditions, this equipment was specifically designed for measuring static gel strength after a stirring period that simulated slurry placement. The equipment is designed to operate at a maximum temperature of 400° F. at 10,000 psi. The low friction magnetic drive allows the slurry to be stirred while monitoring consistency during the stirring time. After simulating placement time, the motor is shut off and the cord pulling system is attached to the magnetic drive head. Static gel strength is determined by continuously measuring the torque required to rotate the paddle at a very slow speed (0.5° to 2.0° per minute). At such speeds, a magnetic drive has very low friction and very accurate torque measurements can be made. Since the torque measuring system consists of a cordpulling capstan or drum arrangement driven by a variable speed gear motor accurate continuous rotation and means for continuously recording the torque is provided. The gel strength is then calculated from the torque measurement and the vessel geometry. The slow movement of the paddle allows static gel strength to be measured but does not inhibit gel strength development. Gel strength properties can be measured up to a maximum of 1000 lbs/100 ft$^2$.

The standard thixotropic test procedure is as follows:
1. Stir the slurry with the magnetic drive consistometer for one hour while increasing temperature and pressure for ambient conditions to bottom hole circulating temperature (BHCT) and bottom hole pressure (BHP) according to schedule.
2. After one hour's stirring, set static for 15 minutes while continually measuring static gel strength.
3. After a static period of 15 minutes, stir for 15 minutes while continually measuring consistency.
4. Repeat static and stirring times a total of three times.

In the data that was developed, one basic slurry composition was tested. This slurry consisted of API Class H cement, 0.4% carboxymethylhydroxyethyl cellulose by weight of cement, 44% water by weight of cement and retarder as given in Table I.

Table I provides the range of temperatures, pressures and retarder amounts used in each simulated well condition. The temperature range varied from 140° F. to 275° F. The amount of retarder utilized was sufficient to provide at least 3½ hours thickening time at test conditions where thickening time is taken as the definition given in API Specification 10.

TABLE I

| | Test Conditions and Retarder Amounts | |
|---|---|---|
| Temp (°F.) | Pressure (psi) | Percent by Weight Retarder* |
| 140 | 6000 | 0.4 |
| 170 | 8000 | 1.2 |
| 180 | 8000 | 1.2 |
| 200 | 8000 | 1.6 |
| 215 | 8000 | 2.0 |
| 245 | 8000 | 2.2 |
| 275 | 8000 | 2.4 |

*The retarder used was a 1:1 mixture of calcium lignosulfonate and potassium pentaborate.

Table II provides the physical and chemical properties of the titanium compounds tested. Excepting the zirconium containing additives, all compounds were DuPont products.

TABLE II

| | Physical and Chemical Properties of Titanium Compounds Considered as Thixotropic Cement Additives | |
|---|---|---|
| Compound | Physical Form | Chemical Description |
| Zirconium oxychloride | Solid | Zirconium oxychloride (zirconyl chloride) —ZrOCl$_2$ |
| Zirconium acetylacetonate | Liquid | Zirconium chelate of acetylacetone |
| Titanium oxychloride | Liquid | Titanium oxychloride (TiOCl$_2$) |
| Titanium triethanolamine | Liquid (Non-aqueous) | Prepared by reaction of titanium isopropoxide with two moles of triethanolamine. Ti (OCH(CH$_3$)$_2$)$_4$ + 2N(CH$_2$CH$_2$OH)$_3$→ (C$_3$H$_7$O)$_2$Ti[OCH$_2$CH$_2$N(CH$_2$CH$_2$OH)$_2$]$_2$ + 2C$_3$H$_7$OH The two moles of isopropyl alcohol |

TABLE II-continued

Physical and Chemical Properties of Titanium Compounds Considered as Thixotropic Cement Additives

| Compound | Physical Form | Chemical Description |
|---|---|---|
| | | are left in the reaction mixture. Thus, this compound consists of triethanolaxine titanate plus isopropyl alcohol. |
| Titanium monotriethanolamine | Solid | Titanium Monotriethanolaxine, $(NCH_2CH_2O-)_3Ti(OCH(CH_3)_2)$, contains about 19.0% Titanium by weight. |
| Titanium monotriethanolamine plus fructose (Blend I) | Solid | A mixture of 57% titanium monotriethanolamine and 43% fructose by wt. |
| Titanium monotriethanolamine plus fructose (Blend II) | Solid | A mixture of 73% titanium monotriethanolamine and 27% fructose by wt. |
| Titanium triethanolamine deposited on diatomaceous earth | Solid | Titanium triethanolamine deposited on diatomaceous earth. Contains about 4.1% Ti by wt. |
| Titanium monotriethanolamine solution | Liquid | Solution of titanium minotriethanolamine containing about 7.6% Ti by wt. |
| Hydrolyzed, partially polymerized titanium acetylacetonate | Solid | Organic titanate (chelate) from hydrolyzed titanium acetylacetonate. Prepared by controlled addition of water as illustrated below. $Ti(Cl)_2(OC(CH_3) = CHCOCH_3)_2 + 2H_2O \rightarrow Ti(OH)_2(OC(CH_3) = CHCOCH_3)_2 + 2 HCl.$ $Ti(OH)_2(OC(CH_3) = CHCOCH_3)_2 + H_2O \rightarrow$ partially polymerized, solid product. |
| Titanium lactate | Liquid (Aqueous) | Prepared by the reaction of titanium isopropopoxide with two moles of lactic acid in presence of water. $Ti(OCH(CH_3)_2)_4 + 2CH_3CH(OH)COOH \rightarrow [Ti(OH)_2(OCH(CH_3)COO^-)_2][H^+]_2 + 4C_3H_7OH$ The acidic protons are neutralized with ammonium hydroxide. This product may be described as the ammonium salt of titanium lactate. However, the structure of this product is complicated by polymerization of the titanium chelate to some degree. |
| Polymerized titanium lactate | Solid | Polymerized titanium lactate. Prepared from the titanium lactate. Extent of polymerization has been increased to insolublize the chelate and yield a solid containing about 21.4% Ti. |
| Lactic acid reacted with hydrated TiO$_2$ | Solid | One mole of lactic acid reacted with two moles of hydrated $TiO_2$. Ti content is about 20.8% by wt. |
| Titanium tartrate | Liquid | Tartaric acid analog of titanium lactate. Contains about 8.2% Ti by wt. |
| Titanium malate | Solid | Titanium malate which has been spray dried. Contains about 7.9% Ti by wt. |
| Titanium acetylacetonate | Liquid (Non-aqueous) | Prepared by the reaction of titanium isopropoxide with two moles of acetylacetone. $Ti(OCH(CH_3)_2)_4 + 2(CH_3COCH_2COCH_3) \rightarrow Ti(OC_3H_7)_2[OC(CH_3) = CHOCH_3]_2 + 2C_3H_7OH$ The two moles of isopropyl alcohol are left in the reaction mixture. |

Table III provides the actual data obtained. The additive description along with the amount of additive used (by weight of cement), temperatures and actual gel strength measurements are shown. The retarder level at each temperature is given in Table I. The gel strengths given are the maximum strength in pounds per 100 feet square reached during each 15 minute period.

TABLE III

| | Gel Strength Measurements[a] | | | | |
|---|---|---|---|---|---|
| Additive | Percent Addition (bwc) | Temperature (°F.) | Gel Strength (lbs/100 ft$^2$) | | |
| | | | 1 | 2 | 3 |
| None | 0 | 140 | 12 | 30 | 70 |
| Zirconium oxychloride | 1.0 | 140 | 60 | 70 | 60 |
| | 1.0 | 200 | 75 | 100 | 95 |

TABLE III-continued

| | Gel Strength Measurements[a] | | | | |
|---|---|---|---|---|---|
| Additive | Percent Addition (bwc) | Temperature (°F.) | Gel Strength (lbs/100 ft²) 1 | 2 | 3 |
| Zirconium acetylacetonate | 0.5 | 140 | 75 | 100 | 160 |
| Titanium oxychloride | 0.5 | 140 | 365 | — | — |
| Titanium tri-ethanolaxine | 0.25 | 140 | 30 | 40 | 32 |
| | 0.50 | 140 | 0 | 0 | 20 |
| | 0.50 | 200 | 350 | 205 | 212 |
| | 0.50 | 275 | 305 | 310 | 225 |
| Titanium Monotriethanol-amine | 0.25 | 140 | 50 | 5 | 15 |
| | 0.25 | 140 | 40 | 20 | 15 |
| | 0.50 | 140 | 50 | 50 | 50 |
| | 0.50 | 140 | 25 | 25 | 25 |
| | 0.25 | 180 | 200 | 320 | 270 |
| | 0.25 | 215 | 500 | 500 | 500 |
| | 0.25 | 275 | 265 | 250 | 220 |
| | 0.50 | 275 | 225 | 500 | 500 |
| Titanium monotriethanol-amine plus fructose (Blend I) | 0.50 | 140 | 500 | 500 | 500 |
| | 0.50 | 275 | 80 | 90 | 85 |
| | 0.50 | 275 | 70 | 100 | 100 |
| Titanium monotriethanol-amine plus fructose (Blend II) | 0.25 | 140 | 400 | 500 | — |
| | 0.50 | 140 | 500 | 500 | 500 |
| | 0.50 | 180 | 200 | 210 | — |
| | 0.50 | 215 | 500 | 500 | 500 |
| | 0.50 | 275 | 500 | 500 | 500 |
| Titanium trie-ethanolaxine deposited on diatomaceous earth | 0.50 | 140 | 135 | 120 | 100 |
| Titanium monotriethanol-amine solution | 0.25 | 180 | 500 | 200 | 250 |
| | 0.50 | 180 | 450 | 500 | 500 |
| Hydrolyzed, partially polymerized titanium acetylacetonate | 0.5 | 140 | 205 | 200 | 205 |
| Titanium Lactate | 0.25 | 170 | 160 | 200 | 215 |
| Polymerized titanium lactate | 0.5 | 275 | 270 | 330 | 235 |
| Lactic acid reacted with hydrated TiO₂ | 0.5 | 140 | 350 | 400 | 300 |
| | 0.5 | 200 | 160 | 160 | 195 |
| | 0.5 | 275 | 40 | 35 | 40 |
| Titanium tartrate | 0.5 | 140 | 115 | 150 | 155 |
| | 0.5 | 275 | 180 | 390 | 280 |
| Titanium malate | 0.5 | 140 | 500 | 500 | 500 |
| | 0.5 | 275 | 20 | 40 | 45 |
| Titanium acetylacetonate[b] | 0.5 | 245 | 450 | 500 | 500 |

[a]Slurry composition: Class H Cement, 0.4% CMHEC, 44% H₂O
[b]Replacement of CMHEC with HEC in slurry formulation This data indicates that certain titanium containing agents can impart thixotropic properties to cements under the above conditions. Such agents are represented by the formula:

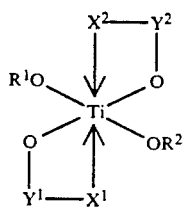

where $X^1$ and $X^2$ represent functional groups containing oxygen or nitrogen, $Y^1$ and $Y^2$ represent two or three carbon atom chains, and $R^1$ and $R^2$ may be hydrogen, substituted or unsubstituted alkyl and aryl groups such as methyl, ethyl, allyl, n-propyl, isopropyl, benzyl, etc., or combinations thereof. Additionally, $-OR^1$, or $-OR^2$ may be halogen atoms.

Additionally, variations of the structure believed effective include complete or partial replacement of the alkoxide, —OR, or halogen atoms with one or more of the allowable $-OY^1X^1-$ or $-OY^2X^2-$ functional groups or replacement of one or more of the $-OY^1X^1-$ or $-OY^2X^2-$ functional groups with alkoxide —OR or halogen. The resultant agent may be used in solid or liquid form, dissolved in aqueous or nonaqueous media, or placed on carriers such as silica, diatomaceous earth or other inert, solid Examples of products observed to be useful in the present invention are more particularly described in the three following formulas:

(a) Acetylacetonate Titanium Chelate—[(CH₃)₂CHO]₂Ti[OC(CH₃)=CHCCH₃O]₂ schematically written:

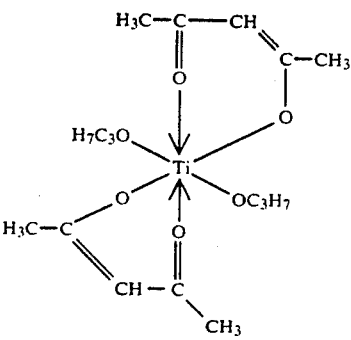

and modifications of this product which include replacement of the —C₃H₇ group with various other alkyl or aryl groups or replacement of the —OC₃H₇ groups with hydroxide or halogens. Partially polymerized versions of this product which involve polymerization at the titanium atom are also useful in this invention. In addition, one or both of the acetylacetonate ligands may be replaced by other beta-diketones. Also, the products may involve only one beta-diketone ligand.

(b) Lactic Acid Titanium Chelate—[(HO)₂Ti(OCH(CH₃)COO—)₂][M⁺]₂, schematically written:

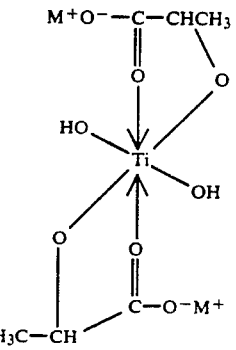

and modifications of this product where M⁺ is hydrogen, alkali metal cation, ammonium, or protonated amine. Partially polymerized versions of this product which involve polymerization at the titanium atom are also useful in this invention. One or both of the lactate ligands may be replaced by a wide variety of other alpha-hydroxy acids such as salicyclic, glycolic, malic, tartaric, citric, alpha-hydroxybutyric, and numerous sugar-derived acids from glyceric to saccharic and gluconic acids. It is also possible to prepare chelates using dicarboxylic acids. Two common chelates of this type are prepared with oxalic and phthalic acids or their salts.

(c) Triethanolamine Titanium Chelate—$[(CH_3)_2CHO]_2Ti[OCH_2CH_2N(CH_2CH_2OH)_2]_2$ schematically written:

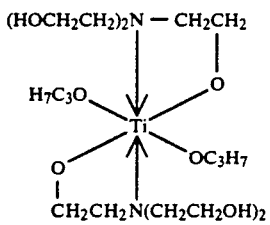

and modifications of this product which include replacement of the —$C_3H_7$ group with various other alkyl or aryl groups or replacement of the —$OC_3H_7$ groups with hydroxide or halogen atoms, and partially polymerized versions of these products. Other ligands useful in this class which may replace one or both of the triethanolamine ligands include tripropanolamine, $(R^1)_2N$—$R^2$—OH where $R^1$ is hydrogen, methyl, or ethyl and $R^2$ is ethyl or propyl, 2-(2-aminoethylamino)ethanol, $(HOR)(R^1)N$—$R^2$—$NR^1R^3$ where R is an ethylenic group and $R^1$, $R^2$, $R^3$ are alkyl, hydroxyalkyl, or aminoalkyl groups, quadrol $[(HOCH(CH_3)CH_2)_2NCH_2CH_2N(CH_2(CH_3)HCOH)_2]$, theed $[(HOCH_2CH_2)_2NCH_2CH_2N(CH_2CH_2OH)_2]$, and various other alkanolamines. These complexes may contain one to four alkanolamine ligands per titanium. A perferred titanium chelate from this class is prepared by the reaction of titanium isopropoxide with two moles of triethanolamine to yield titanium triethanolamine plus two moles of isopropyl alcohol. The product is a liquid containing about 8.3% titanium.

A preferred class of solid titanium chelate is described in U.S. Pat. No. 2,935,522. These agents have the following general formula:

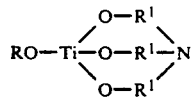

where R is isopropyl (—$C_3H_7$) and $R^1$ is ethylene or isopropylene. A preferred titanium crosslinking agent of this invention is titanium monotriethanolamine represented by the general structure where R is isopropyl and $R^1$ is ethylene. This material is a white, free flowing solid which can be dry blended with the cement. Modifications of this structure include products containing two triethanolamine groups with proposed structure represented by:

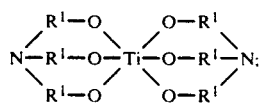

and dimers with a structure assumed to be similar to the following:

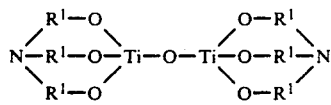

where $R^1$ is ethylene or isopropylene.

In addition, it has been observed that the blending of certain compounds with the titanium chelates tends to enhance the thixotropic response observed with a given chelate. At low temperatures, especially below about 140° F., the cement compositions containing the described titanium chelates show limited thixotropic properties. The reason for this is believed to be a tendency at these low temperatures for the titanium to be in a form which renders it ineffective as a crosslinking agent. The addition of an effective amount of certain sugars activates the titanium at the low temperatures and allows it to act as an effective crosslinking agent. A preferred compound of this type is fructose although it is presumed that compounds such as mannose, glucose, arabinose, galactose, catechol and other compounds containing hydroxyl groups in the cis configuration would function as well.

A preferred embodiment of the present invention was tested under actual downhole conditions. The well conditions were as follows:

Total depth: 22,000'
Liner: 5" (23 lb/ft)
Bottom hole static temperature: 325° F.
Cement placement: 17,264' to 22,000'

The well was in an area which had a highly fractured zone from 19,100' to 19,200'. The zone had been detected by a 10' drill bit drop while drilling. At this point the well began taking 8.7 lb/gal drilling fluid at a rate which exceeded 10 barrels/hr.

A slurry having the following composition was first prepared and tested in the laboratory:

50/50 (by volume) API Class H Cement/fly ash
17% fine silica flour
0.4% calcium lignosulfonate
0.4% Potassium pentaborate
1.0% Carboxymethyhydroxyethyl cellulose
0.4% Titanium triethanolamine
Sufficient water to achieve a 13.4 lb/gal slurry weight The cementing operation was performed in a one stage operation with partial returns maintained throughout the job. Cement was located at 453' above the liner top. Bond logs indicated satisfactory to excellent bond throughout the interval.

It should be noted that a variety of retarders may be used in the cement compositions of the present invention, but these retarders must not significantly disperse the slurry in question. The reason for avoiding retarders that will thin the slurry is that such dispersants will also adversely affect the slurries thixotropic properties. An example of a preferred retarder system is calcium lignosulfonate and potassium pentaborate in a 1:1 ratio by weight.

The crosslinkable material may also work as a retarder. This is one reason that CMHEC and HEC are preferred materials at higher temperatures. Both CMHEC and HEC are known to act as cement set retarders. The polymers containing acrylic acid also display retardation properties. The other named crosslinkable materials do not significantly retard the set of a cement slurry and as such are useful primarily at lower temperatures.

It should be noted that the extent of retardation does not significantly affect the thixotropic properties of the cement composition, so long as the retarder used doesn't significantly disperse the slurry in question. For example, the time to develop static gel strength remains the same whether or not the composition is pumped for 2 or 8 hours.

The amount of titanium necessary to impart significant thixotropic properties to the cement composition will vary with respect to desired static gel strength, the amount of crosslinkable material present and termperature. Hence, the general amount required may vary from approximately 0.01% to about 10% by weight of cement. The preferred range will generally be about 0.25% to about 0.75% by weight of cement.

A preferred subclass of titanium chelate is the alkanolamines. Within this preferred subclass, a preferred alkanolamine is titanium triethanolamine. The most preferred titanium chelate is the solid form of titanium monotriethanolamine. Hence, the most preferred composition would be comprised of one or more of the preferred titanium chelates, one or more of the preferred crosslinkable agents and fructose.

While particular embodiments of the invention have been described, it will be understood that the invention is not limited thereto, since modifications may be made and will become apparent to those skilled in the art. For example, the titanium chelate can be deposited on an inert carrier to facilitate blending into the dry cement. Such carriers could include diatomaceous earth or silica flour.

What is claimed is:

1. A method for combating lost circulation in a zone during cementing of oil, gas, and water wells comprising pumping a thixotropic cement slurry into said zone, terminating pumping, and allowing said static slurry to set, wherein said slurry comprises water, hydraulic cement, an effective amount of crosslinking agent selected from the group consisting of titanium chelates and an effective amount of crosslinkable agent selected from the group consisting of water-soluble cellulose ethers; polyvinyl alcohol; homopolymers, copolymers and terpolymers of AMPS (2-acrylamido - 2-methlypropane sulfonic acid), sodium vinylsulfonate, acrylamide, N,N dimethylacrylamide and acrylic acid; and mixtures thereof.

2. The method of claim 1 wherein said crosslinking agent is titanium monotriethanolamine.

3. The method of claim 2 wherein the titanium monotriethanolamine is in solid form and between 5% and 50% by weight sugar selected from the group consisting of fructose, mannose, glucose, arabinose, galactose, catechol and mixtures thereof, is dry blended therewith.

4. The method of claim 2 wherein the titanium monotriethanolamine is in solid form and between 10% and 30% by weight of fructose is dry blended therewith.

5. The method of claim 1 wherein said crosslinking agent is titanium triethanolamine.

6. The method of claim 1 wherein the crosslinkable agent is carboxymethylhydroxyethyl cellulose.

7. The method of claim 1 wherein the crosslinkable agent is hydroxyethyl cellulose.

8. The method of claim 1 wherein said titanium chelate is present in an amount of from about 0.01% to about 10% by weight of cement.

9. The method of claim 1 wherein said titanium chelate is present in an amount of from about 0.25% to about 0.75% by weight of cement.

10. The method of claim 1 wherein said titanium chelate is deposited on a neutral carrier.

11. The method of claim 10 wherein said neutral carrier is diatomaceous earth or silica flour.

12. A method of combating lost circulation during cementing of the annular space between the casing and the formation wall of an oil or gas well or the like comprising pumping a thixotropic cement slurry into said space, terminating pumping, and allowing said slurry to set, wherein said slurry comprises water, hydraulic cement and effective amounts of titanium monotriethanolamine and carboxymethylhydroxyethyl cellulose.

13. The method of claim 12 wherein the titanium monotriethanolamine contains fructose.

14. The method of claim 13 wherein said titanium monotriethanolamine is present in an amount of from about 0.25% to about 0.75% by weight of cement.

* * * * *